United States Patent
Saidi et al.

(10) Patent No.: US 11,809,349 B1
(45) Date of Patent: *Nov. 7, 2023

(54) DIRECT INJECTION OF A VIRTUAL INTERRUPT

(71) Applicant: Amazon Technologies, Inc., Seattle, WA (US)

(72) Inventors: Ali Ghassan Saidi, Austin, TX (US); Adi Habusha, Moshav Alonei Abba (IL); Itai Avron, Petah Tikva (IL); Tzachi Zidenberg, Kfar Hasidim (IL); Ofer Naaman, Hod Hasharon (IL)

(73) Assignee: Amazon Technologies, Inc., Seattle, WA (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/304,240

(22) Filed: Jun. 16, 2021

Related U.S. Application Data

(63) Continuation of application No. 16/014,833, filed on Jun. 21, 2018, now Pat. No. 11,042,494.

(51) Int. Cl.
| | | |
|---|---|---|
| *G06F 13/24* | (2006.01) | |
| *G06F 11/07* | (2006.01) | |
| *G06F 9/455* | (2018.01) | |

(52) U.S. Cl.
CPC .......... *G06F 13/24* (2013.01); *G06F 9/45558* (2013.01); *G06F 11/0712* (2013.01); *G06F 2009/45579* (2013.01); *G06F 2201/815* (2013.01); *G06F 2213/24* (2013.01)

(58) Field of Classification Search
CPC .. G06F 13/24; G06F 9/45558; G06F 11/0712; G06F 2009/45579; G06F 2201/815; G06F 2213/24
See application file for complete search history.

(56) References Cited

U.S. PATENT DOCUMENTS

| | | | | |
|---|---|---|---|---|
| 4,887,202 | A | * 12/1989 | Tanaka | G06F 9/4843 703/21 |
| 2010/0049892 | A1 | * 2/2010 | Schwarz | G06F 13/24 710/262 |

(Continued)

OTHER PUBLICATIONS

U.S. Appl. No. 16/014,833, "Non-Final Office Action", dated Jun. 26, 2020, 12 pages.

(Continued)

*Primary Examiner* — Wissam Rashid
(74) *Attorney, Agent, or Firm* — Weaver Austin Villeneuve & Sampson LLP

(57) ABSTRACT

An interposer circuit is used between an interrupt controller and a processor core to facilitate direct injection of a virtual interrupt into a guest executing on the processor core, even though the interrupt controller does not support the direct injection. The interposer circuit can convert a command received from the interrupt controller for a physical interrupt into another command for a virtual interrupt to make the processor core believe that the processor core has received a virtual interrupt even though the interrupt controller is not able to provide the virtual interrupt. The virtual interrupt can be directly injected into the processor core without the intervention of a hypervisor executing on the processor core.

20 Claims, 9 Drawing Sheets

(56) References Cited

U.S. PATENT DOCUMENTS

| | | | |
|---|---|---|---|
| 2013/0047157 A1* | 2/2013 | Suzuki | G06F 9/45533 |
| | | | 718/1 |
| 2016/0077848 A1 | 3/2016 | Tu et al. | |
| 2016/0098289 A1 | 4/2016 | Lim et al. | |

OTHER PUBLICATIONS

U.S. Appl. No. 16/014,833, "Final Office Action", dated Dec. 10, 2020, 13 pages.
U.S. Appl. No. 16/014,833, "Notice of Allowance", dated Feb. 24, 2021, 8 pages.
U.S. Appl. No. 16/014,833, "Corrected Notice of Allowance", dated Mar. 11, 2021, 2 pages.
Arm Limited, GICv3 and GICv4 Software Overview, 2015, 50 pages.

* cited by examiner

300

| ... | ID LENGTH 304 | ... | FIRST COMMAND INDICATOR 302 |
|---|---|---|---|
| | INTID 306 | | |

FIG. 3A

| ACTIVE 306a | ID LENGTH 304 | ... | FIRST COMMAND INDICATOR 302 |
|---|---|---|---|
| VIRTUAL MACHINE IDENTIFIER (VMID) 306b | | | PHYSICAL INTERRUPT IDENTIFIER (PINTID) 306c |

FIG. 3B

DIRECT INJECTION OF A VIRTUAL INTERRUPT

CROSS-REFERENCE TO RELATED APPLICATIONS

This application is a continuation of U.S. patent application Ser. No. 16/014,833, filed Jun. 21, 2018, and issued as U.S. Pat. No. 11,042,494 on Jun. 22, 2021, entitled "DIRECT INJECTION OF A VIRTUAL INTERRUPT", the content of which is herein incorporated by reference in its entirety.

BACKGROUND

In certain virtualized computer systems, a virtual interrupt can be injected into a guest executing in a virtual machine through a hypervisor. For example, the virtual interrupt can be delivered by an interrupt controller to a processor executing the virtual machine. The processor may invoke the hypervisor, which in-turn can process the necessary commands to direct the virtual interrupt to the correct guest. However, the injection of virtual interrupts through the hypervisor can be an expensive process in terms of latency in servicing the interrupt, and also in terms of performance of the overall system.

BRIEF DESCRIPTION OF THE DRAWINGS

Various embodiments in accordance with the present disclosure will be described with reference to the drawings, in which:

FIG. 3A illustrates an example command received from an interrupt controller related to a physical interrupt targeted for a processor core;

FIG. 3B illustrates a command including information to enable the interposer to perform the conversion, according to certain embodiments;

DETAILED DESCRIPTION

Figure 1:
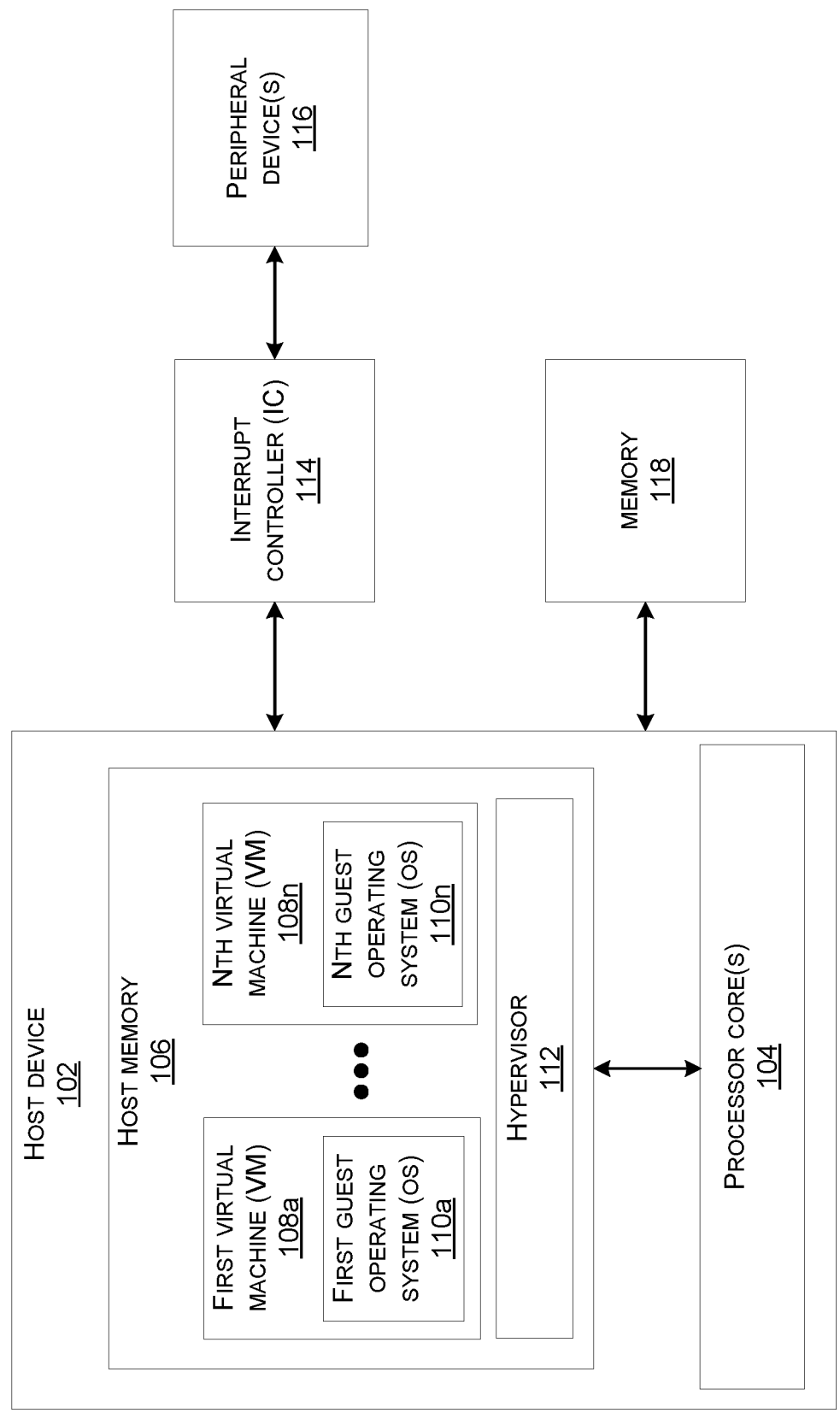
FIG. 1 illustrates a system where certain embodiments of the disclosed technologies can be used.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Virtualized computer systems can support different types of interrupts based on the system architecture. Interrupts may be software generated or hardware generated. An interrupt generated by a peripheral may be directed to a specific processor core or any one of the processor cores in the system. For example, a shared peripheral interrupt (SPI) may be directed to a specific processor core, or to a processor core in a group of processor cores configured to accept the SPIs. SPIs are generally wired interrupts. A hardware interrupt generated by a peripheral that is routed to a specific processor core may be referred to as a private peripheral interrupt (PPI) or a locality-specific peripheral interrupt (LPI). LPIs are generally message based interrupts. For example, a message based interrupt is an interrupt that can be set and cleared by writing to a register in the interrupt controller. The message based interrupts can support a large number of interrupts without requiring dedicated signals for each interrupt source. Software generated interrupts (SGIs) may be generated by a CPU and can be used for inter-process communication. SGIs are generally message based interrupts.

In virtualized computer systems, a virtual machine (VM) can represent virtualized hardware on which a guest operating system (also termed as a guest herein) can execute. The VM may be any suitable emulation of a computer system that may be managed by a hypervisor. Generally, in a virtualized computer system, a virtual interrupt can be injected into a running guest via the hypervisor. For example, in a system with generic interrupt controller version three (GICv3) by ARM® limited, virtual interrupts can be injected via a set of list registers that can assert interrupts to the guest. In such cases, multiple interrupts can be pending to the guest simultaneously. The hypervisor may process necessary commands to create data structures to deliver virtual interrupts to the correct guest. However, injection of the virtual interrupt into a running guest via the hypervisor can increase the overhead of virtualizing the guest and can cause additional latency. Certain systems can allow forwarding a virtual interrupt directly to a guest without invoking the hypervisor. This may be referred to as a direct injection of virtual interrupts into the guest. For example, a GICv4 (version four) by ARM® limited can support direct injection of virtual LPIs into a running guest. However, certain systems may include interrupt controllers (e.g., GICv3) which cannot support commands for the direct injection even though the CPU may support the direct injection. For example, CPUs based on the ARMv8 architecture can support both the GICv3 and the GICv4.

Certain embodiments of the disclosed technologies can provide systems and methods to allow direct injection of interrupts into a guest without invoking the hypervisor using an interrupt controller which does not support the direct injection. In the embodiments, an interposer circuit can be used between a processor core and the interrupt controller to manipulate the commands and responses between the processor core and the interrupt controller to make the processor core believe that it has received a virtual interrupt even though the interrupt controller is not able to send the virtual interrupt. The hypervisor may configure the interrupt controller and the interposer circuit to enable the conversion of certain physical interrupts into corresponding virtual interrupts for a specific guest executing on the processor core.

In some embodiments, the hypervisor can configure the interrupt controller to implicitly encode certain information in a portion of an interrupt identifier (INTID) for a physical interrupt by programming the interrupt controller to use a specific interrupt number that is based on a format which can be decoded by the interposer circuit to determine if a conversion from the physical interrupt to the virtual interrupt has to be performed. For example, the hypervisor may program the interrupt controller to generate an INTID to include an active flag as one of the bits to indicate whether the conversion from the physical interrupt to the virtual interrupt is enabled. The hypervisor may also program the interrupt controller to encode a virtual machine identifier (VMID) in the INTID, which may be associated with a VM configured to execute the guest to be injected with the virtual interrupt. Remaining bits of the INTID may include a physical interrupt identifier (pINTID) for the physical interrupt which may be used to generate a virtual interrupt identifier for the virtual interrupt. The interposer circuit may be configured to determine whether the conversion from the physical interrupt to the virtual interrupt has to be performed based on the value of the active flag and the VMID provided in the INTID for the physical interrupt.

According to certain embodiments, the interrupt controller may provide to the interposer circuit a command comprising the INTID for a physical interrupt, and a command indicator indicating that the command is for the physical interrupt. The physical interrupt may be a message based interrupt, which may be generated by a peripheral device, or by another processor core. For example, the physical interrupt may be an LPI or an SGI. If the interposer circuit is enabled, the interposer circuit may decode a portion of the INITID to determine a conversion indicator to indicate whether the physical interrupt can be converted into the virtual interrupt before sending to the processor core. For example, if the active flag is set to "1", and the VMID corresponds to a VM currently executing the guest on the processor core, the interposer circuit may convert the physical interrupt into the virtual interrupt for direct injection into the guest. In certain embodiments, the active flag may correspond to a most significant bit of the INTID, and the VMID may correspond to two next bits of the INTID.

If the conversion from the physical interrupt to the virtual interrupt is enabled based on the conversion indicator, the interposer circuit may modify the command indicator in the command received from the interrupt controller to indicate that the command is for the virtual interrupt. The interposer circuit may also generate a corresponding virtual INTID (vINTID) for the virtual interrupt using the pINTID, and provide the vINTID in the modified command to the processor core. The processor core may then transfer the virtual interrupt to the running guest based on the modified command indicator and the vINTID instead of interrupting the hypervisor. Thus, the processor core can receive a command for the virtual interrupt by the interposer circuit for direct injection into the guest, even though the interrupt controller does not support generating those commands.

The interposer circuit may also be configured to convert the response received from the processor core for the virtual interrupt into a response for the physical interrupt. For example, in some implementations, the processor core may set a virtual flag in the response to indicate that the response belongs to the virtual interrupt. According to certain embodiments, the interposer circuit may clear the virtual flag in the response before forwarding the response to the interrupt controller to make it appear as a response for the physical interrupt. In certain implementations, the interposer circuit may reset a virtual flag in a response to the processor core to indicate that the response belongs to the physical interrupt. According to the embodiments, the interposer circuit may set the virtual flag in the response to indicate that the response belongs to the virtual interrupt before sending the response to the processor core to make it appear as the response for the virtual interrupt.

Thus, the embodiments of the disclosed technologies can allow direct injection of the virtual interrupt into the running guest without the support of the interrupt controller. A respective interposer circuit may be coupled to each processor core which can perform the conversion between the physical interrupts and the virtual interrupts for a respective guest running on each processor core. For example, in some implementations, the interrupt controller may be the GICv3 by ARM® limited, which cannot support direct injection of the virtual interrupt into the guest running on a processor core based on ARMv8 architecture in comparison to the GICv4. Certain embodiments can provide support for the direct injection of the virtual interrupt without using the GICv4, thus reducing latency caused due to the hypervisor intervention.

FIG. 1 illustrates a system 100 where certain embodiments of the disclosed technologies can be used.

The system 100 may include a host device 102 coupled to an interrupt controller (IC) 114, one or more peripheral devices 116, and memory 118. The host device 102 may include one or more processor cores 104 coupled to a host memory 106. The host device 102 may also include other components which are not shown here for the purposes of simplicity. In some implementations, the system 100 may be part of a server system, which may be configured to provide multi-tenant compute services. For example, the system 100 may provide services such as cloud computing, cloud storage, analytics, web services, databases, applications, deployment services, etc. to different clients. The memory 118 may include a system memory, e.g. a DRAM, SDRAM, DDR SDRAM, etc. The memory 118 may be used to store data associated with the services provided by the system 100.

The host memory 106 may include an SRAM, a flash, a ROM, or any suitable memory. The host memory 106 may include instructions which can be executed to perform the functionalities of a hypervisor 112, and a plurality of virtual machines (VMs) for executing on the processor cores 104. For example, a first VM 108a may be executing a first guest operating system (OS) 110a, and an Nth VM 108n may be executing an Nth guest OS 110n on the processor cores 104. In this specification, a guest OS may also be termed as a guest. The first guest OS 110a executing within the first VM 108a may be assigned a first guest physical address space, and the Nth guest OS 110n executing within the Nth VM 108n may be assigned an Nth guest physical address space.

The hypervisor 112 or a virtual machine manager (VMM) may be configured to emulate a single device as multiple virtual devices in a virtualized environment. The VMs 108a-108n may be any suitable emulation of a computer system that may be managed by the hypervisor 112. For example, the hypervisor 112 may be configured to create, start, monitor, stop or delete the VMs 108a-108n executing on the processor cores 104. In some implementations, the hypervisor 112 can manage access controls, resources, scheduling, isolation, etc. for the VMs 108a-108n. The hypervisor 112 can also manage the flow of information between software, the virtualized hardware, and the physical hardware. In certain embodiments, the hypervisor 112 may configure the IC 114 for management and handling of different interrupts generated by the peripheral devices 116, or the processor cores 104. For example, the hypervisor 112 may assign priorities for the interrupts, and allocate different ranges for different interrupt types (e.g., message based interrupts, software generated interrupts, hardware interrupts) based on the system implementation. Each range may correspond to a group of interrupt numbers or INTIDs for a specific interrupt type. For example, in some implementations, an INTID range of 0-15 may correspond to SGIs, 16-31 may correspond to PPIs, 32-1019 may correspond to SPIs, and 8192 and greater may correspond to LPIs. The upper boundary for the LPIs may be implementation specific.

The IC 114 may be coupled to the host device 102 and the peripheral devices 116. The IC 114 may be configured to receive interrupts generated by one or more peripheral devices 116 and forward them to the one or more processor cores 104. The IC 114 may also be configured to receive an SGI generated by a processor core which may be targeted to another processor core. The peripheral devices 116 may include networking devices, storage devices, graphics processor units (GPUs), input/output (I/O) devices, etc. Certain interrupts generated by a peripheral can be signaled to the IC 114 using a dedicated hardware signal. A message based interrupt can be set and cleared by writing to a register in the IC 114. For example, in GICv3, LPIs are always message based interrupts and can be generated by writing to particular registers. In some implementations, the IC 114 may be configured to perform prioritization and distribution of interrupts for routing to different processor cores 104.

A physical interrupt may be an interrupt which targets a physical processor core, e.g., one of the processor cores 104. For example, the physical interrupt targeted for an ARM® core may be an IRQ, an FIQ, or a system error (SError). A virtual interrupt may be an interrupt that targets a VM executing on a processor core. Corresponding virtual interrupts for the ARM® core may be virtual IRQ, virtual FIQ, and the virtual SError. In some implementations, the IC 114 may not support direct injection of the virtual interrupt into any of the guests executing within the VMs 108*a*-108*n*. In such instances, the virtual interrupt may be injected through the hypervisor 112. For example, a virtual interrupt corresponding to a physical interrupt can be enabled and made pending by the hypervisor 112. In some implementations, the IC 114 may include list registers which can be written by the hypervisor 112 in order to register a virtual interrupt as pending. Each entry in the list can correspond to either a pending or an active interrupt, and can describe a vINTID for the virtual interrupt and a virtual priority of the interrupt among other things. The list registers can be used to assert virtual interrupts to the guest OS. The guest OS may read the list registers to process the interrupt. Thus, the injection of the virtual interrupts into a running guest through the hypervisor 112 may introduce additional latency. Therefore, it may be desirable to allow direct injection of the virtual interrupt into a running guest so that the latency for the hypervisor 112 can be avoided. Some embodiments of the disclosed technologies can allow direct injection of the virtual interrupt into a running guest even though the interrupt controller is not able to support the direct injection. This is further explained with reference to FIG. 2.

Figure 2:
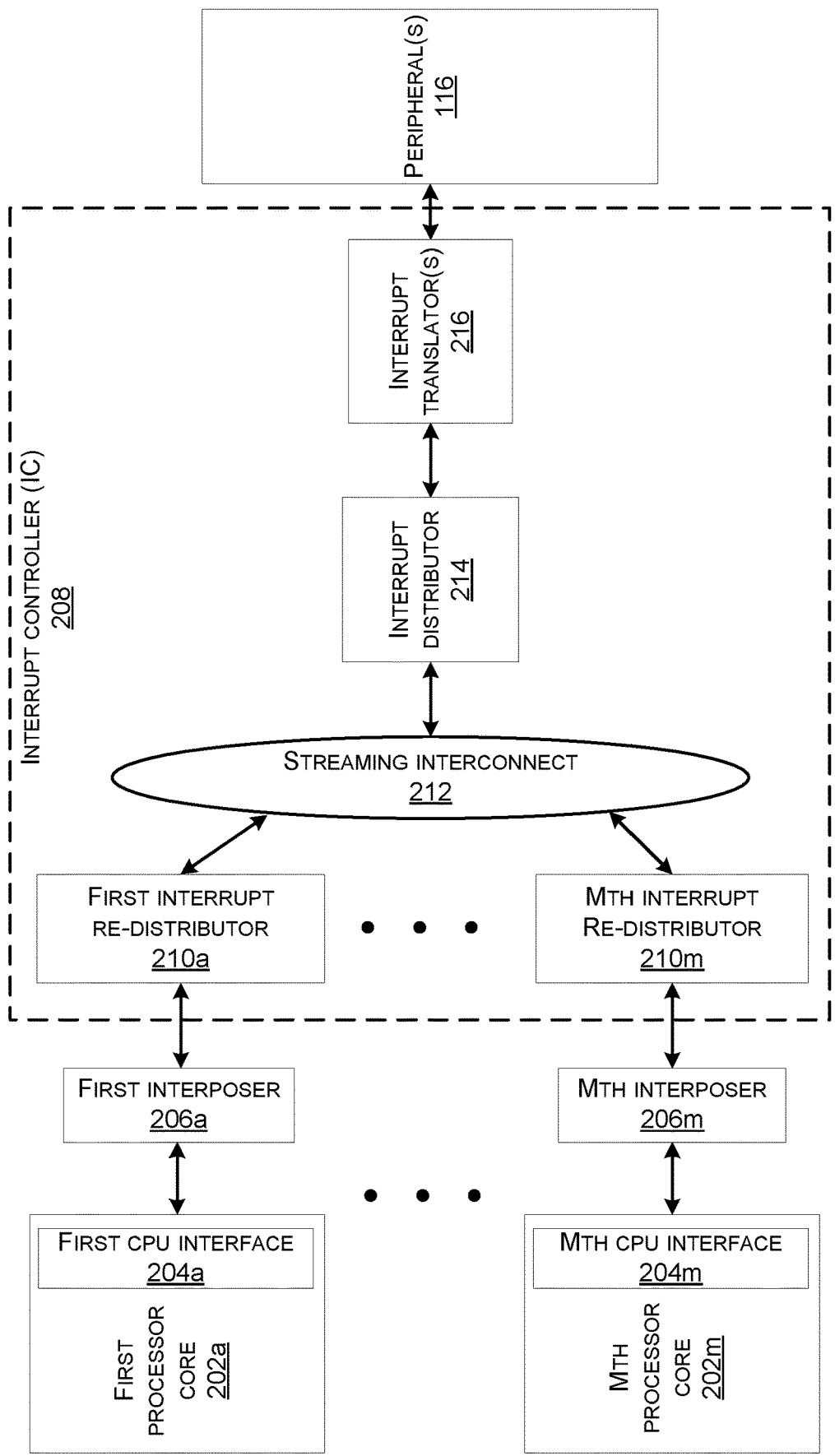
FIG. 2 illustrates a system comprising interposer circuits to facilitate direct injection of virtual interrupts into running guests, in certain embodiments.

FIG. 2 illustrates a system 200 comprising interposer circuits to facilitate direct injection of virtual interrupts into running guests, in certain embodiments.

The system 200 may include multiple processor cores 202*a*, . . . , 202*m* coupled to an interrupt controller (IC) 208 via respective interposer circuits 206*a*, . . . , 206*m*. For example, a first interposer 206*a* may be coupled to a first processor core 202*a* and the IC 208, and an Mth interposer 206*m* may be coupled to an Mth processor core 202*m* and the IC 208. The first processor core 202*a* and the Mth processor core 202*m* may be part of the processor cores 104 of FIG. 1. For example, the first processor core 202*a* and the Mth processor core 202*m* may be configured to execute the hypervisor 112 and the VMs 108*a*-108*n*.

The IC 208 may be coupled to the peripheral devices 116. The peripheral devices 116 may include networking devices, storage devices, graphics processor units (GPUs), input/output (I/O) devices, etc. The peripheral devices 116 may be coupled to the IC 208 using a peripheral component interconnect express (PCIe) interface, or any other suitable interface. The IC 208 may be configured to service the interrupts generated by one or more peripheral devices 116, and route them to the appropriate processor core.

In some embodiments, the IC 208 may include one or more interrupt translators 216 coupled to an interrupt distributor 214. The interrupt distributor 214 may be coupled to a plurality of interrupt re-distributors via a streaming interconnect 212. The streaming interconnect 212 may be based on a stream protocol, e.g., an AXI protocol. A first interrupt re-distributor 210*a* may be coupled to the first interposer 206*a,* and an Mth interrupt re-distributor 210*m* may be coupled to the Mth interposer 206*m*. The interrupt translator 216, the interrupt distributor 214, and the interrupt re-distributors 210*a*-201*m* can be configured by software using respective programming interfaces which may be memory mapped. In some implementations, the IC 208 may include registers (not shown) to provide the programming interfaces for different components.

The interrupt translator 216 may be configured to translate an interrupt generated by a peripheral device 116 or a processor core 114 into a physical interrupt which can be routed to an appropriate interrupt re-distributor 210*a*, . . . , or 210*m*. The interrupt generated by the peripheral device 116 may be a message based interrupt, or message signaled interrupt (MSI). In some embodiments, the one or more peripheral devices 116 may generate an MSI by writing data associated with the interrupt to a control register. The control register may be accessible using a certain memory mapped I/O address. For example, the MSI may be an LPI. The data associated with the interrupt may include an interrupt identifier (INTID) or a source identifier, and a device identifier. The INTID or the source identifier may be used to identify the interrupt sent by the peripheral device 116. The INTID or the source identifier may correspond to an interrupt number which may have been assigned to a particular peripheral device by the hypervisor 112. The device identifier may be associated with a peripheral, and can be used to identify the peripheral from the peripheral devices 116. For example, the device identifier may be in the form of a Bus:Device.Function (BDF) for PCI devices.

The interrupt translator 216 may be controlled using a memory-mapped command queue. The command queue may accept commands to map the device identifiers and the source identifiers into the INTIDs. In some implementations, certain INTIDs may be grouped such that all the INTIDs in a specific group may be routed to the same re-distributor associated with a specific processor core. In some implementations, the interrupt translator 216 may utilize table structures stored in the memory 118 to translate a source identifier associated with a peripheral device into a pending INTID for one of the processor cores 202*a*, . . . , or 202*m*. For example, the interrupt translator 216 may use multiple tables to handle the translation and routing of the MSIs. Device tables may be used to map the device identifiers into corresponding interrupt translation tables. Multiple interrupt translation tables may be used to map the source identifiers into the INTIDs. They may also store a corresponding group identifier for each INTID. Group tables may be used to map the group identifiers into the redistributors. Various tables and registers used in the interrupt translator 216 may be configured by the hypervisor 112. When the peripheral device 116 writes to a control register to generate an MSI, the interrupt translator 216 may select an appropriate entry from the device table using the device identifier. The entry may be used to identify an interrupt translation table from the multiple interrupt translation tables. The device identifier may be used to select an entry from the identified interrupt translation table, which may provide the INTID and the group ID. The group ID may be used to select an entry in the group table, which may provide the routing information. Based on the routing information, the physical interrupt may be forwarded to an appropriate interrupt re-distributor from the interrupt re-distributors 210a, . . . , 210m via the interrupt distributor 214.

The interrupt translator 216 may also be configured to service SGIs generated by a processor core for inter-process communication with another processor core. For example, the first processor core 202a may generate an SGI to communicate with the Mth processor core 202m. The first processor core 202a may write to a specific register in the IC 208 to generate the SGI. The interrupt translator 216 may be configured to translate the SGI into a physical interrupt, which can be asserted to the Mth processor core 202m. In some embodiments, the target processor core may be determined based on the VMID programmed by the hypervisor 112. Note that FIG. 2 shows only one interrupt translator 216 for ease of illustration; however, based on the implementations, more than one interrupt translators 216 may be present.

The interrupt distributor 214 may be configured to perform interrupt prioritization and distribution of certain interrupt types to the appropriate interrupt re-distributor 210a, . . . , or 210m. In some implementations, the interrupt distributor 214 may provide a programming interface for disabling or enabling the interrupts, setting the priority levels for certain interrupts, generating certain MSIs, etc. The interrupt distributor 214 may also be used to translate the MSIs into the INTIDs that can be sent to the interrupt re-distributors 210a, . . . , 210m to interrupt the processor cores 202a, . . . , 202m.

Each of the interrupt re-distributors 210a, . . . , 210m may be connected to a respective CPU interface via the respective interposer 206a-206m. Each of the interrupt re-distributors 210a, . . . , 210m may utilize data structures in the memory 118 for control, prioritization, and pending information for all the physical MSIs. In some implementations, each interrupt re-distributor may include registers to point to these data structures. For example, a configuration register may be used to point to a configuration table for the MSIs in the memory 118, which may be shared by all the interrupt re-distributors 210a, . . . , 210m. The configuration table may include priority for each INTID. Each interrupt re-distributor may include a respective pending register to point to its own pending table in the memory 118. Each pending table in the memory 118 may store state information for the MSIs, e.g., pending or inactive. For example, when an MSI is acknowledged, the state of that MSI may change from pending to inactive. In some implementations, each interrupt re-distributor may cache the MSI configuration information locally.

Each of the first interposer 206a, . . . , or the Mth interposer 206m (herein referred to as an interposer) may be coupled to a respective processor core via a respective CPU interface. For example, the first interposer 206a may be coupled to a first CPU interface 204a in the first processor core 202a, and the Mth interposer 206m may be coupled to an Mth CPU interface 204m in the Mth processor core 202m. Each CPU interface 204a, . . . , 204m may include programmable registers which can be accessed using respective memory-mapped interfaces. Each interposer may receive a command from the IC 208 to assert a physical interrupt to a respective processor core. Each interposer may be configured to convert the commands and responses received from the IC 208 before forwarding to the respective processor core to make the respective processor core believe that the command or the response is for a virtual interrupt even though the IC 208 may not support generating the command or the response for the virtual interrupt. When an interrupt is injected into the respective processor core via the respective CPU interface, the processor core may arbitrate between the virtual interrupt received from the respective interposer and other interrupts logged in the list registers assigned to that guest by the hypervisor 112, and take the highest priority interrupt. Each interposer may also be configured to convert the commands or responses received from the respective processor core for the virtual interrupt before forwarding to the IC 208 to correspond to the physical interrupt originally provided by the interrupt controller.

In some embodiments, each interposer may be configured to receive a command from a respective redistributor for a physical interrupt. The physical interrupt may be an MSI, and may be generated by one of the peripheral devices 116 or by one of the processor cores 202a-202m. For example, the first interposer 206a may receive a command from the first interrupt re-distributor 210a for a first physical interrupt. Similarly, the Mth interposer 206m may receive a command from the Mth interrupt re-distributor 210m for a second physical interrupt. The command received by an interposer may include a command indicator indicating that the command is for the physical interrupt, and an interrupt identifier (INTID) for the physical interrupt. According to certain embodiments, the hypervisor 112 may have programmed the IC 208 to generate an INTID for the physical interrupt to include information which can be used by the interposer to convert the physical interrupt into a virtual interrupt for direct injection into a running guest. For example, the hypervisor 112 may program the table structures in the interrupt translator 216 to generate an INTID to include specific information that can be interpreted by the interposer to perform the conversion. In some embodiments, the hypervisor 112 may set a specific bit in the INTID to "1" to indicate to the interposer to perform the conversion. The interposer, when enabled, can perform the conversion to facilitate direct injection of the virtual interrupt into the guest without going through the hypervisor 112, thus improving the system performance.

In some implementations, the INTID may include 16-bits. The hypervisor 112 may program the INTID with an active flag, a VM identifier (VMID), and a physical INTID (pINTID) for the physical interrupt. For example, the active flag may correspond to the specific bit, which can be set by the hypervisor 112 to enable the conversion from the physical interrupt to the virtual interrupt by the interposer if the IC 208 does not support direct injection of MSIs into the running guest. In some embodiments, the specific bit may be a most significant bit of the INTID (e.g., bit [15]). A value of "1" for the bit [15] of the INTID may indicate that the INTID has a value which is more than 32K and the physical interrupt belongs to a specific group of interrupts (e.g., LPIs). The VMID may correspond to two next bits of the INTID (e.g., bits [14:13]), which may be associated with a VM currently executing on the processor core coupled to the interposer. The pINTID may include remaining bits of the INTID (e.g., bits [12:0]), and may correspond to an interrupt number for the physical interrupt assigned by the hypervisor 112 corresponding to the specific interrupt group.

The interposer may be configured to decode a portion of the INTID (e.g., bits [15:13]) to determine a conversion indicator which can indicate whether a conversion from the physical interrupt to a virtual interrupt is enabled. For example, the interposer may set the conversion indicator to "1" if the active flag is set (e.g., bit [15] is "1"), and the VMID corresponds to a VM currently executing on the processor core. In some implementations, information related to a VM currently executing on the processor core may be programmed in a register in the IC 208. The VMID may be encoded in the INTID to differentiate different guests using the same vINTID for a given pINTID. Note that other encoding mechanisms to enable the interposer to perform the conversion are possible without deviating from the scope of the disclosed technologies.

Based on the conversion indicator indicating that the conversion is enabled, the interposer may convert the command received from the IC 208 with a command indicator indicating that the command is for the physical interrupt to another command with a different command indicator indicating that the command is for the virtual interrupt. For example, in one instance, the command received from the IC 208 may be a first command to set a highest priority pending interrupt for a processor core. In certain embodiments, the interposer may change the first command to a second command to send a virtual interrupt pending for a VM. In another instance, the command received from the IC 208 may be a third command to reset a highest priority pending interrupt. In certain embodiments, the interposer may change the third command to a fourth command to reset a highest priority pending virtual interrupt. An example command received from the IC 208 is shown in FIG. 3A.

FIG. 3A illustrates an example command 300 received from the IC 208 for a physical interrupt targeted for the processor core. The command 300 may include a first command indicator 302, an ID length 304, and an INTID 306. The command 300 may include additional bits which are not shown here for the ease of illustration. For example, in some instances, the command 300 may include priority bits to indicate a priority associated with the physical interrupt.

The first command indicator 302 may be used to indicate that the command 300 is for a physical interrupt. In some implementations, the first command indicator 302 may include 4-bits. The physical interrupt may be generated by one of the peripherals 116 by writing to a register in the IC 208. In some implementations, the interrupt translator 216 may generate an INTID using a source identifier and a device identifier as discussed previously. The interrupt translator 216 may further determine an interrupt re-distributor where the physical interrupt can be routed to. For example, the interrupt translator 216 may set the physical interrupt pending in a pending table in the first redistributor 210*a* for sending to the first processor core 202*a*. The first redistributor 210*a* may send the command 300 to the first CPU interface 204*a* which may be received by the first interposer 206*a*. In one instance, a first value for the first command indicator 302 may indicate that the command is to set the physical interrupt pending with the highest priority in the first processor core 202*a*. For example, the first value for the first command indicator 302 may correspond to a "Set" command in the GICv3. In another instance, a second value for the first command indicator 302 may indicate that the command is to clear a pending physical interrupt with the INTID 306. For example, the second value for the first command indicator 302 may correspond to a "Clear" command in the GICv3. The ID length 304 may indicate a number of INTID bits. For example, the INTID may include 16 bits, 24 bits, or 32 bits.

In certain embodiments, the hypervisor 112 may encode certain information in the INTID 306 which can enable the interposer to convert the physical interrupt into a virtual interrupt for direct injection into a running guest on the processor core. For example, the hypervisor 112 may have configured the IC 208 to implicitly encode certain information in the INTID 306 for the physical interrupt by programming the IC 208 to use a specific interrupt number that is based on a format which can be decoded by the interposer to determine if a conversion from the physical interrupt to the virtual interrupt has to be performed. This is further explained with reference to FIG. 3B.

FIG. 3B illustrates the command 300 including information to enable the interposer to perform the conversion, according to certain embodiments. For example, the hypervisor 112 may encode the INTID 306 to include an active flag 306*a*, a VMID 306*b*, and a pINTID 306*c*, which can be decoded by the interposer to determine whether or not to perform the conversion.

The active flag 306*a* may be used to indicate if a conversion from the physical interrupt to the virtual interrupt is enabled. For example, a value of "1" for the active flag 306*a* may indicate that the conversion is enabled, and a value of "0" may indicate that the conversion is not enabled. The VMID 306*b* may correspond to a VM currently executing on the processor core. The pINTID 306*c* may indicate an interrupt number assigned to the physical interrupt. The interposer may determine if the conversion can be performed based on the active flag 306*a* and the VMID 306*b*, and may change the command 300 to a command 400, as discussed with reference to FIG. 4.

Figure 4:
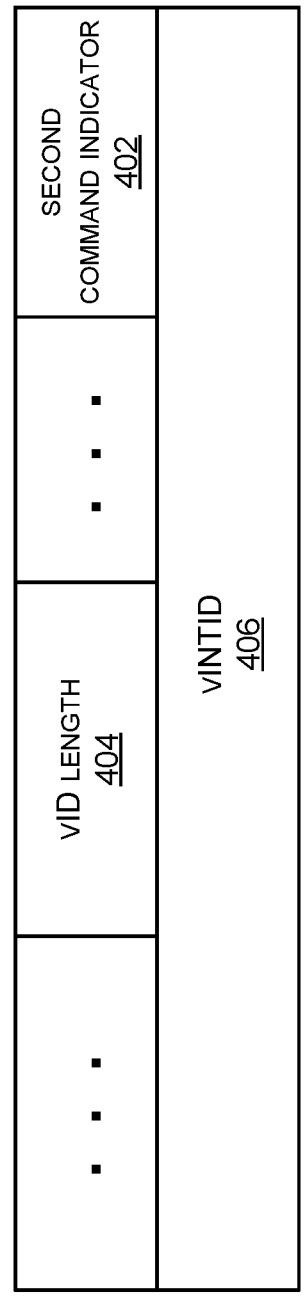
FIG. 4 illustrates a command including information related to a virtual interrupt for direct injection of the virtual interrupt into the running virtual machine, according to certain embodiments.

FIG. 4 illustrates the command 400 which includes information related to a virtual interrupt for direct injection of the virtual interrupt into the running virtual machine, according to certain embodiments. The command 400 may include a second command indicator 402, a vID length 404, and a vINTID 406. The command 400 may include additional bits which are not shown here for the ease of illustration. For example, in some instances, the command 400 may include priority bits to indicate a priority associated with the virtual interrupt.

The second command indicator 402 may be used to indicate that the command 400 is for a virtual interrupt. In some implementations, the second command indicator 402 may include 4-bits. In one instance, a first value for the second command indicator 402 may indicate that the command is to set the virtual interrupt pending with the highest priority in the first processor core 202*a*. For example, the first value for the second command indicator 402 may correspond to a "vSet" command in the GICv4. In another instance, a second value for the second command indicator 402 may indicate that the command is to clear a pending virtual interrupt with the vINTID 406. For example, the second value for the second command indicator 402 may correspond to a "vClear" command in the GICv4. The vID length 404 may indicate a number of vINTID bits. For example, the vINTID may include 16 bits, 24 bits, or 32 bits.

In some embodiments, the interposer may generate the vINTID 406 by adding an offset to the pINTID 306c, or shifting/masking/comparing certain bits of the pINTID 306c. For example, shifting, masking, comparing bits, or the offset may be programmed in one or more configuration registers in the interposer by the hypervisor 112. In certain implementations, the interposer may mask off the active flag 306a and the VMID 306b in the INTID 306, and add 8192 to the pINTID 306c to generate the vINTID 406. Adding 8192 may allow the virtual interrupt to be in the range assigned for the LPIs by the hypervisor 112. In some instances, the interposer may use different values for shifting, masking, or comparing to generate the vINTID 406 which corresponds to an SGI targeted to the processor core. The interposer may provide the command 400 to the respective processor core to directly inject the virtual interrupt into the guest without going through the hypervisor 112.

A CPU interface may receive the command 400 and assert a virtual interrupt to the processor core. For example, in one instance, the CPU interface 204a may receive the command 400 from the first interposer 206a and assert a virtual interrupt (e.g., a vIRQ) to the first processor core 202a. The virtual interrupt may cause the running guest to get interrupted. For example, if the first VM 108a is currently executing on the first processor core 202a, a virtual interrupt received via the CPU interface 204a for the first VM 108a may interrupt the first guest OS 110a executing on the first processor core 202a. The first guest OS 110a may read a register (e.g., an interrupt status register) to read the INTID of the signaled interrupt, without causing a trap to the hypervisor 112. Thus, the virtual interrupt can be directly injected into the running first guest OS 110a without the intervention of the hypervisor 112. In some implementations, reading of the interrupt status register may act as an acknowledge for the interrupt. In some instances, the first processor core 202a may arbitrate between the virtual interrupt received from the first interposer 206a and other interrupts logged in the list registers assigned to the first guest OS 110a by the hypervisor 112, and take the highest priority interrupt.

Each CPU interface may be further configured to send a response to the IC 208 for the virtual interrupt. For example, the CPU interface 204a may send a response to the first interrupt re-distributor 210a to acknowledge the virtual interrupt. An example response is shown in FIG. 5.

Figure 5:
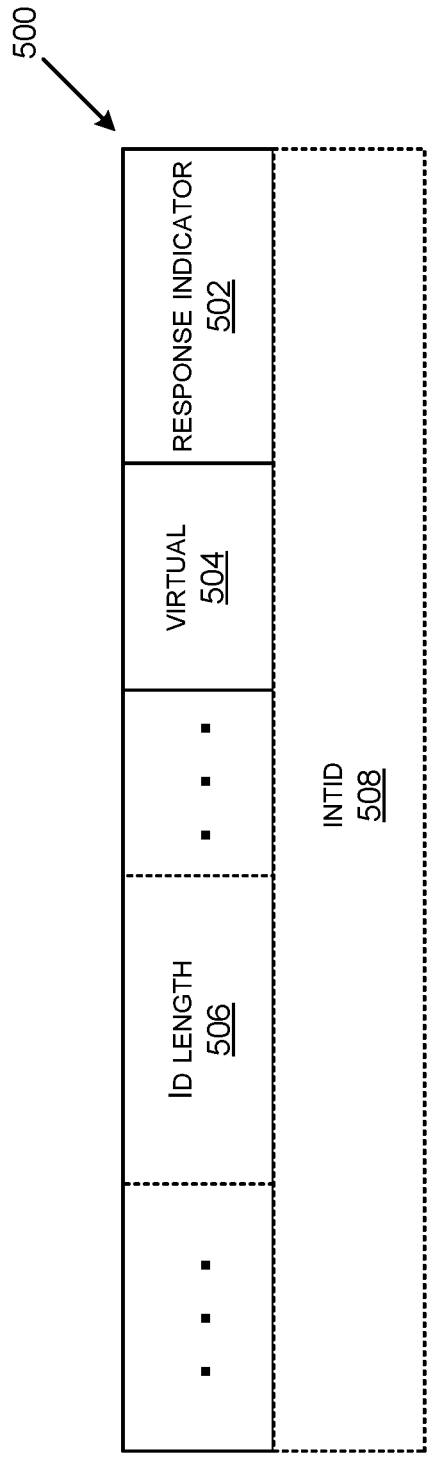
FIG. 5 illustrates an example response provided by a processor core for the virtual interrupt.

FIG. 5 illustrates an example response 500 provided by the processor core for the virtual interrupt. The response 500 may include a response indicator 502, a virtual flag 504, an optional ID length 506, and an optional INTID 508. The response 500 may include additional bits which are not shown here for the ease of illustration.

The response indicator 502 may be used to indicate that the response is for a virtual interrupt if the virtual flag 504 is set to "1", or for a physical interrupt if the virtual flag 504 is set to "0." The interposer may be configured to detect if the virtual flag 504 is set to "1" indicating that the response 500 corresponds to a virtual interrupt, and reset the virtual flag 504 to "0" to correspond to a physical interrupt since the IC 208 may expect a response for the physical interrupt as sent originally in the command 300.

In some instances, a first value for the response indicator 502 may indicate a response to acknowledge an interrupt. For example, the first processor core 202a may send the response 500 in response to the command 400 sent by the first interposer 206a. In some implementations, the first interrupt re-distributor 210a may clear the pending physical interrupt corresponding to the INTID 508. A second value for the response indicator 502 may indicate a response to release the interrupt when the processor core cannot handle a particular interrupt. In some implementations, the processor core may not provide the INTID 508 and the ID length 506 with the response for certain commands. For example, in some instances, the response 500 may correspond to a response by the processor core to acknowledge the receipt of a command from the IC 208 to clear a virtual interrupt or a physical interrupt. In such cases, no INTID may be needed since only a single command to clear the interrupt can be outstanding for the CPU interface at any time. A third value" for the response indicator 502 may indicate a response to acknowledge the receipt of the command, and a value of "0" for the virtual flag 504 may indicate that the response 500 corresponds to a command to clear a physical interrupt, and a value of "1" for the virtual flag 504 may indicate that the response 500 corresponds to a command to clear a virtual interrupt. In some instances, the IC 208 may send an acknowledge for the response 500, as discussed with reference to FIG. 6.

Figure 6:
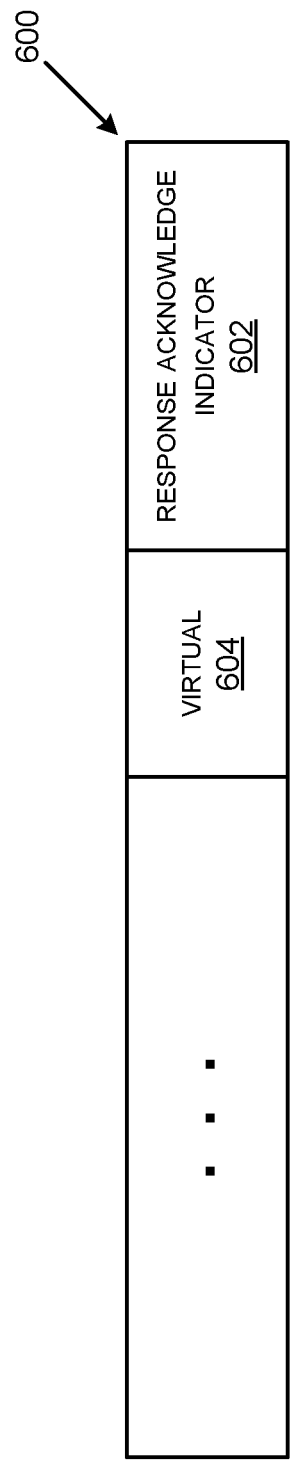
FIG. 6 illustrates an example response provided by the interrupt controller to acknowledge the response from the processor core, in certain embodiments.

FIG. 6 illustrates an example response 600 provided by the IC 208 to acknowledge the response from the processor core, in certain embodiments. The response 600 may include a response acknowledge indicator 602, and a virtual flag 604.

The response acknowledge indicator 602 may be used to indicate that the response acknowledge is for a virtual interrupt if the virtual flag 604 is set to "1", or for a physical interrupt if the virtual flag 604 is set to "0." The interposer may be configured to detect if the virtual flag 604 is set to "0" indicating that the response 600 corresponds to a physical interrupt and set the virtual flag 604 to "1" to correspond to a virtual interrupt to send to the processor core.

In some instances, a first value for the response acknowledge indicator 602 may indicate an acknowledge to confirm receipt of the response. For example, the first interposer 206a may send the response 600 to acknowledge the response 500 sent by the first processor core 202a.

Figure 7:
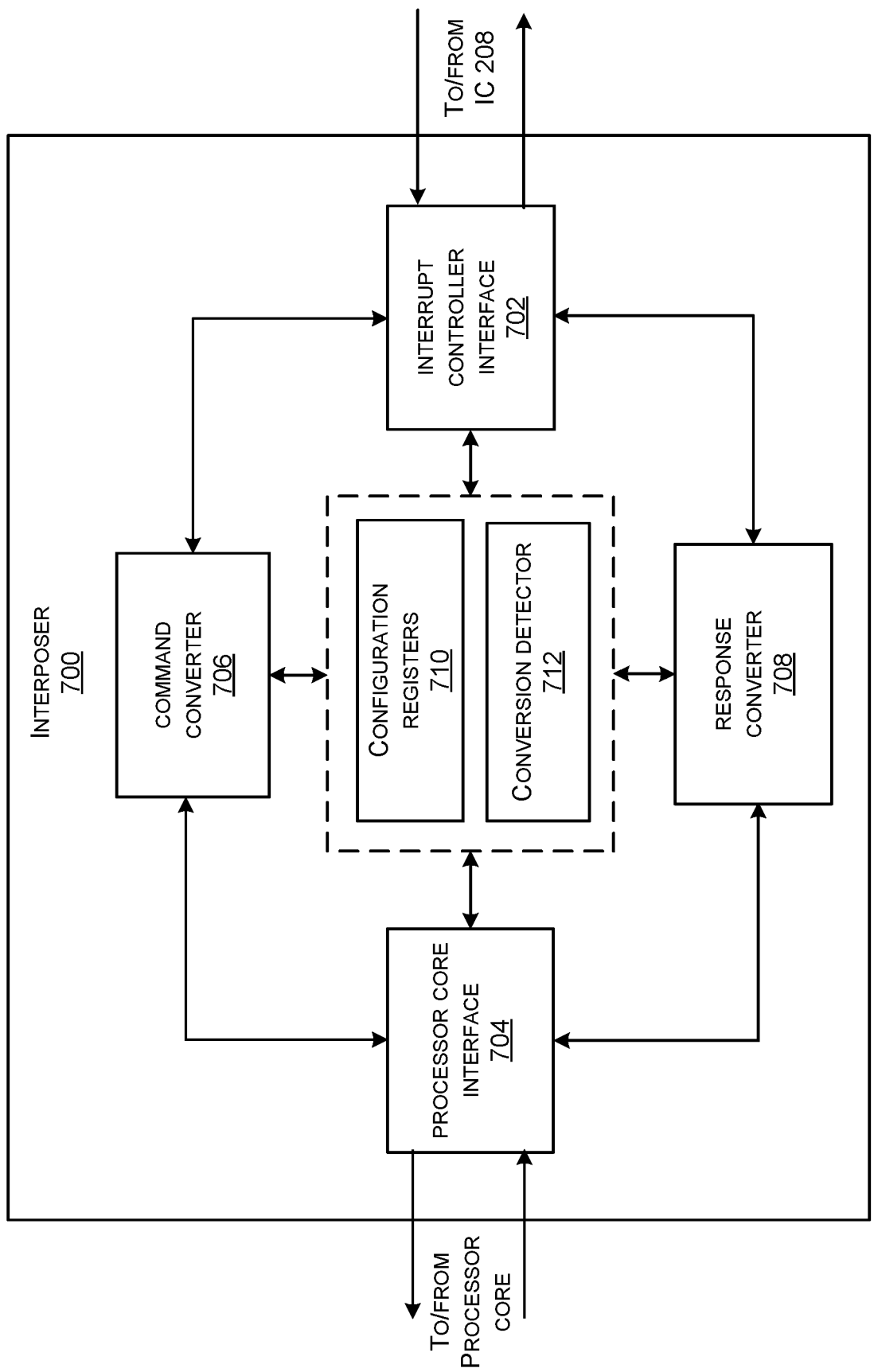
FIG. 7 illustrates components of an interposer according to certain embodiments.

FIG. 7 illustrates components of an interposer 700 according to certain embodiments. The interposer 700 may be similar to the first interposer 206a, . . . , or the Mth interposer 206m. The interposer 700 may include an interrupt controller interface 702, a processor core interface 704, a command converter 706, a response converter 708, configuration registers 710, and a conversion detector 712. The interposer 700 may be implemented using a field programmable gate array (FPGA) or any suitable circuit.

The interrupt controller interface 702 may be configured to communicate with the IC 208. For example, the interrupt controller interface 702 may be configured to receive commands from a respective interrupt re-distributor from the first interrupt re-distributor 210a, . . . , or the Mth interrupt re-distributor 210m in the IC 208. The interrupt controller interface 702 may also be configured to provide responses to the respective interrupt re-distributor for the commands.

The processor core interface 704 may be configured to communicate with a respective processor core from the first processor core 202a, . . . , or the Mth processor core 202m. For example, the processor core interface 704 may be configured to provide commands to a respective processor core via a respective CPU interface from the first CPU interface 204a, . . . , or the Mth CPU interface 204m. In one instance, the processor core interface 704 may provide the second command (e.g., the command 400) to the respective processor core based on the conversion indicator indicating that the conversion is enabled. In another instance, the processor core interface 704 may provide the first command (e.g., the command 300) to the respective processor core based on the conversion indicator indicating that the conversion is not enabled. In some instances, the processor core interface may provide the first command for the physical interrupt to the processor core if the INTID does correspond to a range assigned to a specific group of interrupts. For example, in some implementations, if the INTID does not correspond to LPIs, the processor core interface may provide the first command to the respective processor core, since direct injection of virtual interrupts may not be supported for interrupts other than the LPIs. The processor core interface 704 may also be configured to receive responses from the respective processor core for the commands.

The configuration registers 710 may include registers which may be written by the hypervisor 112 to configure the interposer 700 to perform certain functionalities. For example, the configuration registers 710 may include registers to shift, mask, compare, or add certain bits in the commands or responses received by the interposer 700 before forwarding them to the respective processor core or the interrupt re-distributor. The shift or mask registers may be used to mask off the active flag and the VMID in the INTID bits in the first command to generate the vINTID for the second command. In some implementations, the configuration registers 710 may also include an offset register to store an offset value for adding to the pINTID 306*c* to generate the vINTID 406. In other implementations, the vINTID 406 may be generated by shifting, masking, or comparing certain bits of the pINTID 306*c*.

The conversion detector 712 may be configured to determine whether a conversion has to be performed between a physical interrupt and a virtual interrupt for a command or a response. In certain embodiments, the conversion detector 712 may determine a conversion indicator to indicate that the conversion has to be performed if an active flag is set in an INTID received from the IC 208, and the VMID in the INTID corresponds to a VM currently executing on the processor core coupled to the interposer. Referring back to FIG. 3B, the conversion detector 712 may determine the conversion indicator based on the active flag 306*a* and the VMID 306*b* received with the command 300.

If the conversion indicator is determined to be "1", a command received from the IC 208 via the interrupt controller interface 702 for a physical interrupt may be converted to another command for a virtual interrupt to make the processor core believe that it has received information for a virtual interrupt even though the IC 208 may not support sending a virtual interrupt. If the conversion indicator is determined to be "0", a command received from the IC 208 via the interrupt controller interface 702 for a physical interrupt may be forwarded to the processor core without any modifications via the processor core interface 704. The conversion detector 712 may also be configured to determine whether a virtual flag in a response received from a respective processor core or the IC 208 is set to indicate that the response is for the virtual interrupt, or reset to indicate the response is for the physical interrupt. For example, a response received from the respective processor core via the processor core interface 704 for a virtual interrupt may be updated to reset or clear a virtual flag in the response to correspond to a physical interrupt before sending to the IC 208 since the IC 208 may not support receiving a virtual interrupt. Additionally, a response received from the IC 208 via the interrupt controller interface 702 for a physical interrupt may be updated to set a virtual flag in the response to correspond to a virtual interrupt before sending to the respective processor core to make the processor core believe that it has received information for a virtual interrupt.

The command converter 706 may be configured to convert a first command received from the IC 208 via the interrupt controller interface 702 into a second command to send to the respective processor core via the processor core interface 704. In some instances, the first command may be similar to the command 300. Based on the conversion indicator determined by the conversion detector 712, the command converter 706 may convert the command 300 into the command 400. In one instance, the command converter 706 may convert the first command indicator 302 for a first command related to setting the physical interrupt to the second command indicator 402 for a second command related to setting the virtual interrupt. The command converter 706 may also mask off the active flag 306*a* and the VMID 306*b* in the INTID 306, and add an appropriate offset value to the pINTID 306*c* to generate the vINTID 406 using the configuration registers 710. Converting the physical interrupt to the virtual interrupt can allow direct injection of the virtual interrupt into the running VM even though the IC 208 may not support the direct injection of the virtual interrupt.

The response converter 708 may be configured to update a response received from the processor core or the IC 208 to set or reset a virtual flag. For example, the response may be similar to the response 500 received from the respective core, or the response 600 received from the IC 208. The response converter 708 may reset the virtual flag 504 in the response 500 to make the response correspond to the physical interrupt before sending to the IC 208. For example, the response converter 708 may update the virtual flag 504 from "1" to "0." The response converter 708 may set the virtual flag 604 in the response 600 to make the response correspond to the virtual interrupt before sending to the respective processor core. For example, the response converter 708 may update the virtual flag 604 from "0" to "1." A method executed by the interposer 700 to enable direct injection of the virtual interrupt is discussed with reference to FIG. 8.

Figure 8:
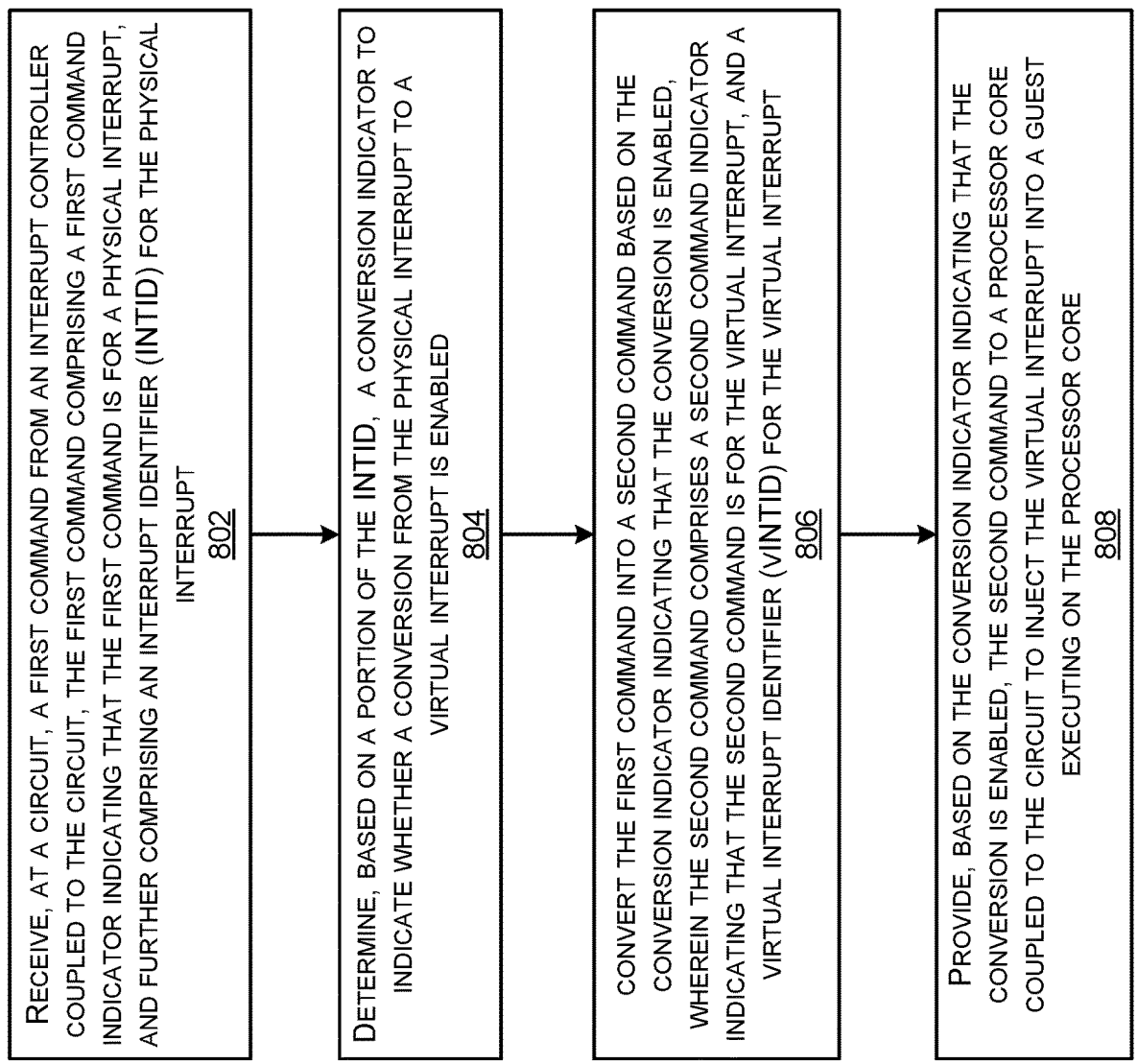
FIG. 8 illustrates a method executed by a circuit to enable direct injection of the virtual interrupt into a guest currently executing on a processor core, according to certain embodiments.

FIG. 8 illustrates a method executed by a circuit to enable direct injection of a virtual interrupt into a guest currently executing on a processor core, according to certain embodiments. The circuit may be one of the first interposer 206*a*, . . . , or the Mth interposer 206*m*, as discussed with reference to FIG. 2.

In a step 802, the circuit may receive a first command from an interrupt controller coupled to the circuit. The first command may comprise a first command indicator indicating that the first command is for a physical interrupt, and an interrupt identifier (INTID) for the physical interrupt. The physical interrupt may be generated by a peripheral device coupled to the interrupt controller, or from a processor core. Referring back to FIG. 2, the first interposer 206*a* may receive a first command from the IC 208 for a physical interrupt. The physical interrupt may be a message based interrupt, e.g., an LPI or an SGI. The peripheral 116 may be a storage device, a networking device, a GPU, an I/O device, or any other peripheral which can generate an MSI. For example, in one instance, the peripheral 116 may have written to a register in the IC 208 to generate the physical interrupt. In another instance, the first processor core 202*a* may have written to another register in the IC 208 to generate a physical interrupt for communicating with a target processor core. The target processor core may be determined using the VMID. As shown in FIGS. 3A and 3B, the first command may be the command 300 generated by the first interrupt re-distributor 210a. In one instance, the first command indicator 302 may indicate a first command to set a physical interrupt pending in the first processor core 202a. The INTID 306 may include specific information which may have been programmed by the hypervisor 112 to enable the interposer to perform the conversion. For example, the active flag 306a may be set to "1" by the hypervisor 112 which may indicate to the interposer that the conversion is enabled. The INTID 306 may further include the VMID 306b and the pINTID 306c. The first interposer 206a may receive the command 300 via the interrupt controller interface 702.

In a step 804, the circuit may determine, based on a portion of the INTID, a conversion indicator to indicate whether a conversion from the physical interrupt to a virtual interrupt is enabled. The first interposer 206a may determine a conversion indicator based on the active flag 306a and the VMID 306b. If the active flag 306a is set to "1", and the VMID 306b corresponds to a VM (e.g., the first VM 108a) currently executing on the first processor core 202a, the conversion detector 712 in FIG. 7 may set the conversion indicator to "1" to enable the conversion from the physical interrupt to the virtual interrupt.

In a step 806, the circuit may convert, based on the conversion indicator indicating that the conversion is enabled, the first command into a second command. The second command may comprise a second command indicator indicating that the second command is for the virtual interrupt, and a virtual interrupt identifier (vINTID) for the virtual interrupt. The command converter 706 in FIG. 7 may convert the command 300 into the command 400 if the conversion indicator is set to "1." For example, the command converter 706 may change the first command indicator 302 to the second command indicator 402, mask off the active flag 306a and the VMID 306b in the INTID 306, and add an offset to the pINTID 306c to generate the vINTID 406 for the command 400. The offset and the masking bits may be programmed in one or more registers in the configuration registers 710 by the hypervisor 112.

In a step 808, the circuit may provide, based on the conversion indicator indicating that the conversion is enabled, the second command to a processor core coupled to the circuit to directly inject the virtual interrupt into a guest executing on the processor core. The command 400 may be provided to the first processor core 202a via the processor core interface 704. For example, if the first VM 108a is currently executing on the first processor core 202a, a virtual interrupt received via the CPU interface 204a for the first VM 108a may interrupt the first guest OS 110a executing on the first processor core 202a. The first guest OS 110a may read a register (e.g., an interrupt status register) to process the virtual interrupt, without causing a trap to the hypervisor 112. Thus, the virtual interrupt can be directly injected into the running first guest OS 110a without invoking the hypervisor 112.

Figure 9:
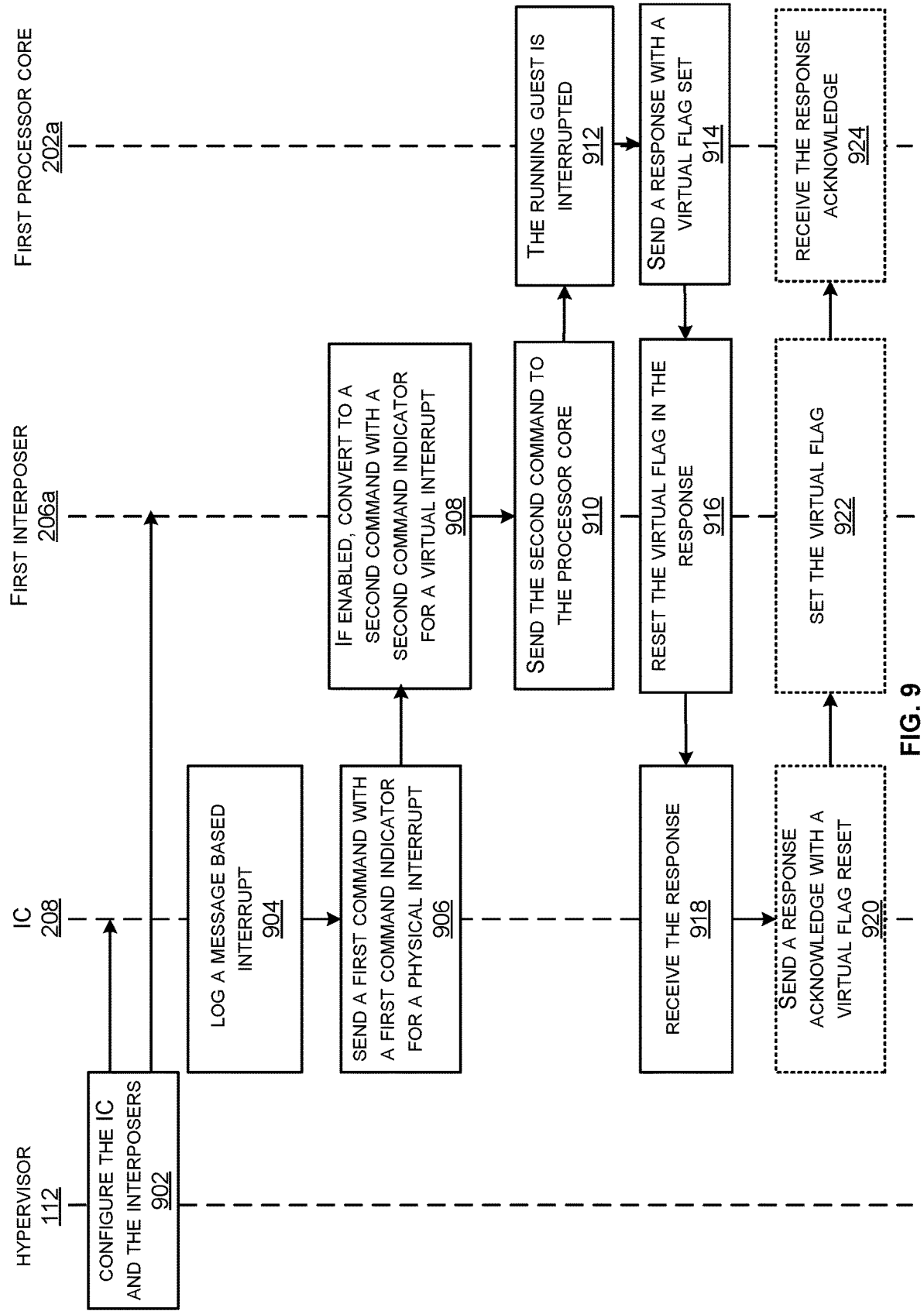
FIG. 9 illustrates communication among a hypervisor, the interrupt controller, a first interposer, and a first processor core for direct injection of a virtual interrupt into a guest currently executing on the first processor core, according to certain embodiments.

FIG. 9 illustrates communication among the hypervisor 112, the IC 208, the first interposer 206a, and the first processor core 202a for direct injection of a virtual interrupt into a guest currently executing on the first processor core 202a, according to certain embodiments.

In a step 902, the hypervisor 112 may configure the IC 208 and the interposers 206a-206m. For example, the hypervisor 112 may initialize the tables or registers in the IC 208 with default values. In some implementations, the hypervisor 112 may program the ID length 304 for the size of the INTID bits, and assign INTIDs for different groups of interrupts. For example, the hypervisor 112 may configure the table structures in the interrupt translators 216 to generate a specific INTID for a particular peripheral device or a particular interrupt source. The hypervisor 112 may also program configuration registers in each of the interposers 206a-206m with offsets, masking bits, shifting bits, etc.

In a step 904, at any instance, a message based interrupt or an MSI may be logged in the IC 208. The MSI may be generated by one of the peripherals 116. For example, the MSI may be an LPI generated by writing to one of the registers in the IC 208. In some instances, the MSI may be a SGI generated by one of the processor cores. The LPI or the SGI may be set as a physical interrupt pending in a pending table in the first interrupt re-distributor 210a.

In a step 906, the IC 208 may send a first command with a first command indicator for a physical interrupt to the first interposer 206a. For example, the first command may be the command 300. The first interrupt re-distributor 210a may send the command 300 to the first interposer 206a. The hypervisor 112 may have included the active flag 306a, the VMID 306b, and the pINTID 306c in the command 300 to enable the conversion to a virtual interrupt for direct injection of the virtual interrupt into a running guest on the first processor core 202a.

In step 908, the first interposer 206a may determine a conversion indicator to indicate whether the conversion from the physical interrupt to the virtual interrupt is enabled based on the active flag 306a and the VMID 306b in the command 300. If the conversion indicator is set, the first interposer 206a may convert the first command to the second command with the second command indicator for the virtual interrupt. For example, the first interposer 206a may convert the command 300 to the command 400 for the virtual interrupt. In some instances, the first interposer 206a may convert a command to set the physical interrupt pending to another command to set the virtual interrupt pending to make the first processor core 202a believe that it has received a virtual interrupt even though the IC 208 is not able to send the command 400.

In a step 910, the first interposer 206a may send the second command to the first processor core 202a. The first interposer 206a may send the command 400 to the first processor core 202a via the first CPU interface 204a. The first CPU interface 204a may assert an interrupt (e.g., vIRQ) to the first processor core 202a.

In a step 912, the running guest on the first processor core 202a may be interrupted. For example, the first guest OS 110a may get interrupted and read the interrupt status register without trapping to the hypervisor 112. Thus, the virtual interrupt was injected directly into the running guest without the intervention of the hypervisor 112.

In a step 914, the first processor core 202a may send a response with a virtual flag set. For example, the first processor core 202a may send the response 500 with the virtual flag 504 set to "1" to correspond to the virtual interrupt. The first CPU interface 204a may send the response 500 for the first redistributor 210a. In one instance, the response 500 may correspond to a command to acknowledge the virtual interrupt.

In a step 916, the first interposer 206a may reset the virtual flag in the response. For example, the first interposer 206a may reset the virtual flag 504 in the response 500 to correspond to the physical interrupt. The first interposer 206a may send the response to the first redistributor 210a.

In a step 918, the IC 208 may receive the response 500 with the virtual flag reset to "0."

In a step 920, the IC 208 may send a response acknowledge with a virtual flag reset. For example, the IC 208 may send the response 600 to acknowledge the response 500. The virtual flag 604 may be set to "0" in the response 600 to correspond to the physical interrupt. In one instance, the response 600 may correspond to a response to confirm receipt of the acknowledge command.

In a step 922, the first interposer 206a may set the virtual flag in the response. For example, the first interposer 206a may set the virtual flag 604 in the response 600 to correspond to the virtual interrupt.

In a step 924, the first processor core 202a may receive the response acknowledge. For example, the first processor core 202a may receive the response 600 with the virtual flag set corresponding to the virtual interrupt.

Note that the steps 920, 922, and 924 may be optional, and may be different or absent based on the implementation.

As described with reference to FIGS. 2-9, an interposer circuit can be used between a processor core and an interrupt controller to manipulate the commands and responses to make the processor core believe that it has received a virtual interrupt even though the interrupt controller is not able to provide commands for the virtual interrupt. Thus, certain embodiments can allow direct injection of lower latency interrupts into a guest running on the processor core without invoking the hypervisor.

Figure 10:
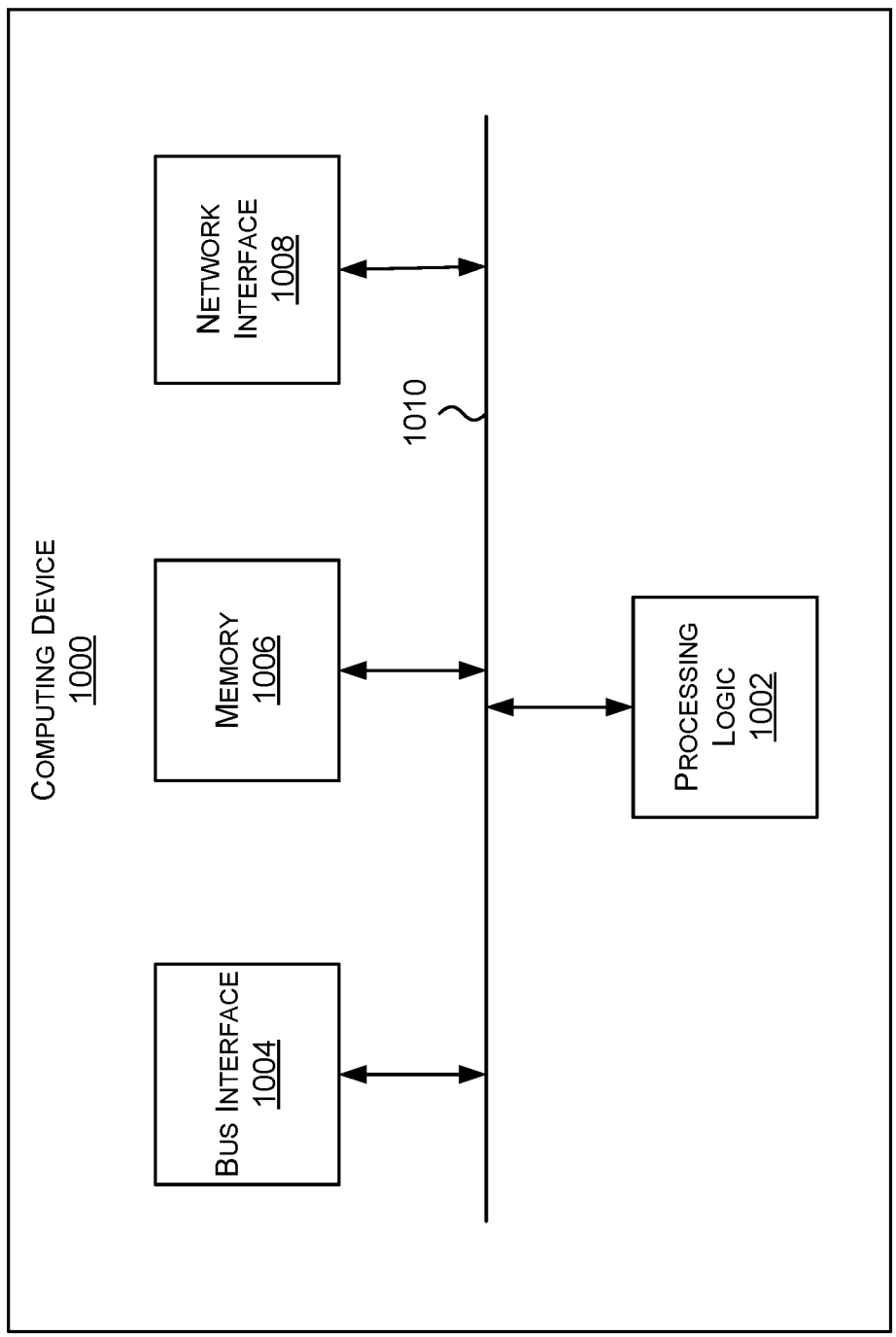
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations. A computing device 1000 may perform computations to facilitate processing of a task. As an illustrative example, computing device 1000 can be part of a server in a multi-tenant compute service system. Various hardware and software resources of computing device 1000 can be allocated to a client upon request.

In one example, the computing device 1000 may include processing logic 1002, a bus interface module 1004, memory 1006, and a network interface module 1008. These modules may be hardware modules, software modules, or a combination of hardware and software. In certain instances, modules may be interchangeably used with components or engines, without deviating from the scope of the disclosure. The computing device 1000 may include additional modules, which are not illustrated here for the ease of illustration. In some implementations, the computing device 1000 may include fewer modules. In some implementations, one or more of the modules may be combined into one module. One or more of the modules may be in communication with each other over a communication channel 1010. The communication channel 1010 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores (e.g., the first processor core 202a, . . . the Mth processor core 202m), wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. For example, the processor cores may be configured to execute virtual machines, e.g., the first VM 108a, . . . , the Nth VM 108n, executing their respective guest OSs. The VMs may be managed by the hypervisor 112 executing on the processor cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1006.

The processing logic 1002 may also include the interposer circuits (e.g., the first interposer 206a, . . . , the Mth interposer 206m) and the IC 208, as discussed with reference to FIG. 2. For example, in certain systems, the IC 208 cannot support direct injection of the virtual interrupt into guests running on the processor cores. Thus, the interrupts can be injected into the running guests via the hypervisor 112 executing on the processor cores, which may increase the latency and impact the system performance. In such cases, the interposer circuits may be used between the IC 208 and the processor cores to enable the direct injection of the virtual interrupts into the guests without going through the hypervisor 112.

The memory 1006 may include either volatile or non-volatile, or both volatile and non-volatile types of memory. The memory 1006 may, for example, include random access memory (RAM), read only memory (ROM), Electrically Erasable Programmable Read-Only Memory (EEPROM), flash memory, and/or some other suitable storage media. In some cases, some or all of the memory 1006 may be internal to the computing device 1000, while in other cases some or all of the memory may be external to the computing device 1000. The memory 1006 may store an operating system comprising executable instructions that, when executed by the processing logic 1002, provides the execution environment for executing instructions providing functionality to perform convolution computations for the computing device 1000. The memory may also store and maintain several data structures and tables for facilitating the functionality of the computing device 1000. For example, the memory 1006 may be similar to the memory 118.

The bus interface module 1004 may enable communication with external entities, such as the peripheral devices 116 and/or other components in a computing system, over an external communication medium. The bus interface module 1004 may include a physical interface for connecting to a cable, socket, port, or other connection to the external communication medium. The bus interface module 1004 may further include hardware and/or software to manage incoming and outgoing transactions. The bus interface module 1004 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1004 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 1008 may include hardware and/or software for communicating with a network. This network interface module 1008 may, for example, include physical connectors or physical ports for wired connection to a network, and/or antennas for wireless communication to a network. The network interface module 1008 may further include hardware and/or software configured to implement a network protocol stack. The network interface module 1008 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 802.11 network, a cellular network, an Infiniband network, etc. In some embodiments, the computing device 1000 may receive a set of parameters, such as the aforementioned weight values for convolution computations, from a server through network interface module 1008.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A circuit configured to:
   receive a first command from an interrupt controller to assert a physical interrupt, the physical interrupt originating from a peripheral device;

determine a conversion from the physical interrupt to a virtual interrupt is to be performed;
convert the first command into a second command based on the determination that the conversion is to be performed, wherein the second command includes an indicator that indicates the second command is for the virtual interrupt;
provide the second command to inject the virtual interrupt into a virtual machine without invoking a hypervisor that is managing the virtual machine;
receive a response acknowledging the virtual interrupt, the response including a virtual flag;
clear the virtual flag in the response; and
send the response to the interrupt controller.

2. The circuit of claim 1 wherein the determination of the conversion is performed by decoding an interrupt identifier.

3. The circuit of claim 1, wherein the physical interrupt is set by writing a register.

4. The circuit of claim 1, wherein the conversion of the first command to the second command includes generating a virtual interrupt identifier.

5. The circuit of claim 1, wherein the circuit is an interposer circuit communicatively coupled between a processor core and the interrupt controller.

6. The circuit of claim 5, wherein the interposer circuit is one of a plurality of interposer circuits that are each communicatively coupled to a corresponding processor core.

7. An interrupt controller circuit, comprising:
a peripheral device interface;
a processor interface;
an interrupt translator circuit configured to translate a device identifier received from the peripheral device interface into an interrupt identifier for inclusion into an interrupt, and use device identifier to select an entry from an interrupt translation table that provides a group identifier to lookup routing information for the interrupt; and
an interrupt distributor circuit configured to distribute the interrupt to an interrupt re-distributor for transmission to a processor core, wherein the interrupt re-distributor is one of a plurality of interrupt re-distributors communicatively coupled to a plurality of respective processor cores.

8. The interrupt controller circuit of claim 7, wherein the interrupt is a physical interrupt, and wherein the interrupt re-distributor is configured to provide the physical interrupt to an interposer circuit for translation into a virtual interrupt for injection into a virtual machine without invoking a virtual machine manager that manages the virtual machine.

9. The interrupt controller circuit of claim 7, wherein the interrupt translator circuit is configured to use the device identifier to select an entry from a device table that maps device identifiers to interrupt translation tables.

10. The interrupt controller circuit of claim 7, wherein the interrupt translator circuit is configured to use the device identifier to select an entry to an interrupt translation table, the entry providing the interrupt identifier for the interrupt.

11. The interrupt controller circuit of claim 7, wherein the interrupt translator circuit is configured to set a priority of the interrupt.

12. A method comprising:
receiving, at a circuit, a first command from an interrupt controller coupled to the circuit, the first command comprising a first command indicator indicating that the first command is for a physical interrupt;
converting, by the circuit, the first command into a second command, the second command comprising a second command indicator indicating that the second command is for a virtual interrupt;
providing, by the circuit, the second command to a processor core coupled to the circuit to bypass a hypervisor executing in the processor core to inject the virtual interrupt into a virtual machine;
receiving a response from the processor core acknowledging the virtual interrupt;
modifying the response to associate the response with the physical interrupt; and
sending the modified response to the interrupt controller.

13. The method of claim 12, wherein modifying the response includes clearing a virtual interrupt indicator in the response.

14. The method of claim 12, wherein the physical interrupt is set by writing a register.

15. The method of claim 12, wherein the first command includes an indication that the first command is to be converted into the second command.

16. The method of claim 12, wherein the first command includes an interrupt identifier and an encoded virtual machine identifier.

17. The method of claim 16, wherein a virtual machine identifier corresponding to the virtual machine is encoded in the interrupt identifier.

18. The interrupt controller circuit of claim 7, further comprising a memory-mapped command queue to store command for controlling the interrupt translator circuit.

19. The interrupt controller circuit of claim 7, further comprising an interrupt register configured to generate a software generated interrupt (SGI) in response to being written by the processor core.

20. The interrupt controller circuit of claim 19, wherein the interrupt translator circuit is configured to translate the SGI into a physical interrupt.

* * * * *